C. H. HODGKINS.
MOTOR CONTROL SYSTEM.
APPLICATION FILED SEPT. 10, 1917. RENEWED JAN. 5, 1921.

1,406,383.

Patented Feb. 14, 1922.
2 SHEETS—SHEET 1.

WITNESSES:
Felix C. Rodgers
R. J. Fitzgerald

INVENTOR
Charles H. Hodgkins
BY
ATTORNEY

C. H. HODGKINS.
MOTOR CONTROL SYSTEM.
APPLICATION FILED SEPT. 10, 1917. RENEWED JAN. 5, 1921.

1,406,383.

Patented Feb. 14, 1922.

2 SHEETS—SHEET 2.

WITNESSES:
Felix C. Rodgers
R. J. Fitzgerald

INVENTOR
Charles H. Hodgkins
BY
Wesley G. Carr
ATTORNEY

UNITED STATES PATENT OFFICE.

CHARLES H. HODGKINS, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

1,406,383.

Specification of Letters Patent.   Patented Feb. 14, 1922.

Application filed September 10, 1917, Serial No. 190,424. Renewed January 5, 1921. Serial No. 435,251.

*To all whom it may concern:*

Be it known that I, CHARLES H. HODGKINS, a subject of the King of Great Britain, and a resident of Pittsburgh, in the county of Allegheny and State of Pennsylvania, have invented a new and useful Improvement in Motor-Control Systems, of which the following is a specification.

My invention relates to motor-control systems and it has particular relation to starting devices for electric motors.

My invention has for one of its objects to provide a simple combination to operate in a single direction to effect the acceleration of electric motors and then to return to its initial position.

A second object of my invention is to provide means whereby the speed of a pilot motor for operating a controller may be controlled automatically in accordance with operating conditions.

In a starting apparatus constructed in accordance with my invention, a pilot motor actuates a drum controller continuously in a single direction to effect the shunting of a starting resistor and then to return to its initial position. The running position of the controller coincides with the initial or "off" position. The pilot motor operates automatically to actuate the controller through the cycle described above, independently of the operation of the main motor which it controls.

In one form of my invention, the circuits of the pilot motor are so arranged that the controller is actuated at a relatively slow speed when the main motor is being accelerated and at a relatively high speed when the pilot motor is operating and the circuit of the main motor is open. Moreover, means is provided for preventing the operation of the controller and the pilot motor when the main motor is accelerated and operating under normal conditions.

Figure 1:
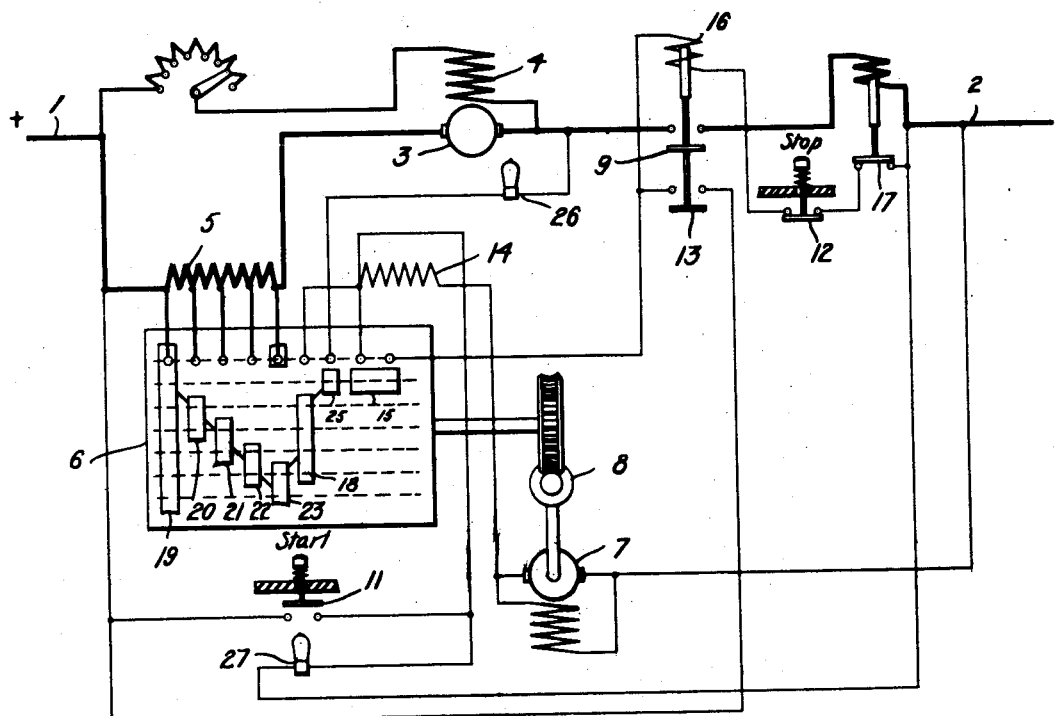
Figure 2:
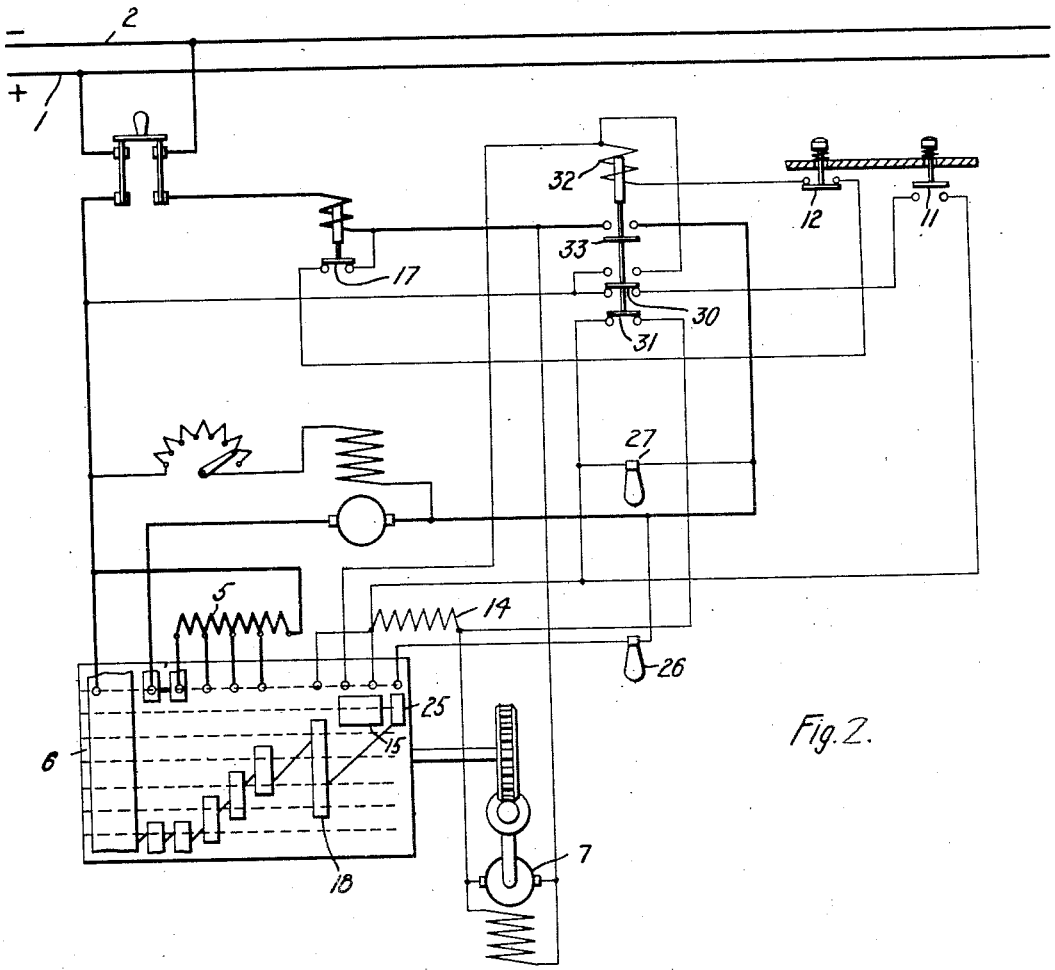
Figure 3:
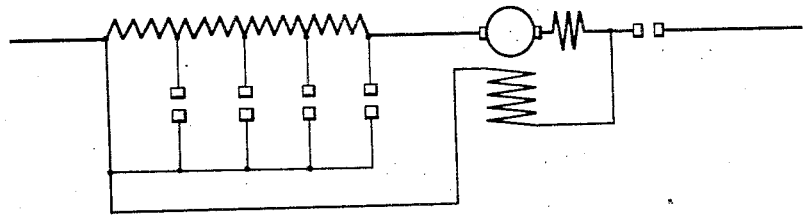

In the accompanying drawings, Fig. 1 is a diagrammatic view of circuits and apparatus embodying my invention. Fig. 2 is a view, similar to Fig. 1, of a modification. Fig. 3 is a schematic arrangement of the principal circuits of the systems of Figs. 1 and 2.

Referring particularly to Fig. 1, line conductors 1 and 2 supply energy to a main or working motor 3 which has a shunt field-magnet winding 4. A starting resistor 5, which is in series with the armature of the motor 3, is controlled by a drum controller 6 which is actuated by a pilot motor 7. The motor 7 is connected to the controller 6 by a reduction-gear mechanism 8.

The circuit of the main motor 3 is controlled by an electromagnetically operable line switch 9. The circuits for controlling the pilot motor and the line switch are controlled by manually operable switches 11 and 12, preferably of the push-button type. The functions of the push-button switches 11 and 12 are indicated by appropriate legends.

To start the main motor, the push-button switch 11 is actuated to complete a circuit that extends from line conductor 1, through push-button switch 11, resistor 14 and pilot motor 7 to line conductor 2. The pilot motor 7 actuates the controller 6 in a clockwise direction, as viewed from the right in Fig. 1.

When the contact segment 15 engages a pair of coacting contact fingers, a circuit is completed which extends from line conductor 1, through push-button switch 11, contact segment 15, actuating coil 16 of switch 9, push-button switch 12 and overload relay 17 to line conductor 2.

The line switch 9 is closed by the coil 16, and the circuit of the main motor, which is thus completed, extends from line conductor 1, through resistor 5, armature of motor 3, line switch 9 and actuating coil of overload relay 17, to line conductor 2. A switch 13 which is mechanically connected to the switch 9, completes a holding circuit for the coil 16. A contact segment 25 completes a circuit for a signal lamp 26 which indicates the closing of the line switch 9.

When a contact segment 18 engages its corresponding contact finger, a circuit for the pilot motor is completed from line conductor 1, through the contact segments 19 to 23, contact segment 18, resistor 14 and pilot motor 7, to line conductor 2. This circuit is maintained by the contact segment 18 throughout the operation of the controller, and the push-button switch 11 may, accordingly, be released as soon as this circuit is completed. The contact segment 25 is disengaged from its contact finger simultaneously with the engagement of the contact segment 18 by the corresponding contact finger, breaking the circuit of the signal lamp 26.

The resistor 5 is shunted gradually as the several contact segments 20 to 23 successively engage the corresponding contact fingers. When the controller 6 is actuated to such position that the contact segment 18 becomes disengaged from its coacting contact finger, the circuit of the pilot motor is broken and the controller comes to rest in its running position which coincides with its initial or "off" position. A signal lamp 27 indicates the period during which the pilot motor 7 is in operation to effect the acceleration of the main motor. The main motor now operates at its normal speed, with the entire resistor 5 shunted by the contact segments 19 and 23.

To stop the motor 3, it is only necessary to actuate the push-button switch 12 to open the circuit of coil 16. This circuit comprises the interlock switch 13. The push-button switch 12 may be actuated at any time during the acceleration of the motor 3. The circuit of the pilot motor 7 is not affected by the stopping of the main motor, and the controller 6 is accordingly actuated to its initial position regardless of the condition of the main motor circuit.

The operation of the main motor is interrupted upon the occurrence of abnormal conditions, such, for example, as failure of voltage or overload conditions. In the former case, the coil 16 is de-energized to permit the line switch 9 to open. In case of an overload upon the motor, the relay 17 opens the circuit of coil 16, and the switch 9 opens the circuit of the motor. It is impossible, however, to effect the starting of the main motor unless the controller is actuated through its initial position to complete the circuit of coil 16 when the entire resistor 5 is in circuit with the motor armature.

Reference may now be had to Fig. 2, in which a modification is illustrated. This system differs from the system shown in Fig. 1 in that the resistor 14 is automatically shunted when the line switch is open and is inserted in series with the pilot motor 7 when the line switch is closed. The speed of the pilot motor 7 is controlled accordingly. The system of this figure is an improvement upon a system disclosed in a copending application by James, Serial No. 121,382, filed September 21, 1916, and assigned to the Westinghouse Electric & Manufacturing Company.

To start the motor, the push-button switch 11 is actuated to complete the circuit of the pilot motor 7. This circuit extends from line conductor 1 through interlock switch 30, push-button switch 11, interlock 31, pilot motor 7 and coil of overload relay 17 to line conductor 2. The circuit of actuating coil 32 of line switch 33 is completed by contact segment 15, in the manner previously described in connection with the corresponding parts. The interlock 30 completes a holding circuit for the coil 32, and the push-button switch 11 may be released and contact segment 18 completes a circuit for the pilot motor 7 in parallel relation to the push button.

During the initial operation of the pilot motor 7, the resistor 14 is shunted and the pilot motor, accordingly, operates at a relatively high speed until the resistor 14 is inserted in circuit therewith by the opening of interlock 31. During the remaining portion of the accelerating period, the pilot motor operates at a relatively slow speed in order that the sections of the starting resistor 5 may be shunted at a rate consistent with safety.

The controller comes to rest in its illustrated or initial position when the contact segment 18 is disengaged from the corresponding contact finger. As in the systems previously described, the controller is actuated continuously in a single direction from its initial position through a complete cycle to effect the starting of the main motor and to return to its normal, inactive position.

It may occur that, during the acceleration of the main motor, the line switch 33 is opened by reason of failure of voltage of the source of supply or because of the operation of relay 17 in case an excessive current traverses the motor circuit. Inasmuch as the circuit of the pilot motor is not affected by the conditions described above, it will be obvious that, in case of failure of voltage, the pilot motor will operate to complete its cycle upon the return of normal-voltage conditions.

In any event, it is desirable to restore the controller 6 to its initial position without delay. This result is accomplished by the operation of the interlock switch 31 to shunt the resistor 14 when the line switch 33 is open. It will be apparent, therefore, that the operation of the pilot motor 7 takes place at a relatively high speed at all times when the line switch is open. This condition includes the initial movement of the controller to effect the closing of line switch 33 and of operations of the controller to return to its normal position when the circuit of the main motor is open.

I claim as my invention:

1. The combination with an electric motor and a controller therefor, of means for closing the circuit of said motor, electro-responsive means for actuating said controller and having a resistor and means for short-circuiting said resistor when said closing means is in an inoperative position.

2. The combination with an electric motor and a controller therefor, of a switch for closing the circuit of said motor, a switch mechanically connected thereto, and a pilot motor for actuating said controller and having a resistor, said mechanically connected switch serving to short-circuit said resistor when said closing switch is open.

3. The combination with an electric motor and a controller therefor, of a switch for closing the circuit of said motor and having an actuating coil, a switch mechanically connected to said closing switch, a pilot motor for actuating said controller, and means comprising said mechanically connected switch for operating said pilot motor at high speed when said closing switch is open, said mechanically connected switch establishing a holding circuit for said coil and controlling the operation of said pilot motor at low speed when said closing switch is closed.

4. In a system of control, the combination with a main motor, a controller for governing the acceleration of said main motor, and a pilot motor for operating said controller at different speeds, of means for operating said pilot motor at uniform low speed during the acceleration of said motor.

5. In a system of control, the combination with a main motor, a controller for governing the acceleration of the motor, and a pilot motor for operating the controller, of means governed by the circuit conditions of the main motor for operating the pilot motor at either one of two uniform speeds.

6. In a system of control, a main motor, a controller associated with the main motor, and electro-responsive means for automatically operating said controller first at high speed and then at low speed during the operation of starting and accelerating said main motor.

7. In a system of control, a controller, a pilot motor for operating the controller, and having a resistor and means for short-circuiting said resistor to vary the speed of the pilot motor in accordance with the condition of the circuits passing through the controller.

8. In a system of control, a controller, having a plurality of circuits passing therethrough, that is operable in a single direction, a motor for operating said controller, and means for governing the speed of said motor in accordance with the condition of the circuits passing through the controller.

9. In a system of control, a main motor, a controller associated with the main motor, a pilot motor for operating the controller, and means controlled by said controller for operating the pilot motor at an increased speed when the main motor is de-energized.

10. In a system of control, a main motor, a line switch for completing the circuit of said main motor, and a pilot motor for governing the acceleration of said main motor, of a resistor in series with said pilot motor and means for short-circuiting said resistor when said line switch is de-energized.

11. In a system of control, a main motor, a line switch for completing the circuit of the main motor, and means, comprising a controller and a pilot motor, for governing the acceleration of the main motor, of a resistor in series with the pilot motor and means, comprising an interlock switch associated with the line switch, for short circuiting said resistor when the line switch is de-energized.

12. In a system of control, the combination with a main motor, a controller operable in a single direction for governing the acceleration of the motor, and an auxiliary motor for operating the controller, of a line switch for completing the circuit of the main motor, and means governed by said line switch for governing the speed of said auxiliary motor in accordance with the circuit conditions of said main motor.

13. In a system of control, the combination with a main motor, a switch for closing the circuit of said main motor, a controller associated with the main motor, and a pilot motor for operating the controller, of means governed by said switch for preventing the operation of the pilot motor when the controller is operating under normal conditions, and means for controlling the speed of the pilot motor in accordance with the circuit conditions of the main motor.

14. In a system of control, the combination with a main motor, a controller associated with the main motor, and a pilot motor for operating the controller, of means controlled by said controller for indicating the closing of the main motor circuit and for giving a signal when the pilot motor is operating.

15. The combination with an electric motor and a controller therefor, of a switch for closing the circuit of said motor, a pilot motor for actuating said controller, a signal device, and means controlled by said controller for closing said switch and operating said signal device when said pilot motor actuates said controller to a predetermined position.

16. The combination with a dynamo-electric machine and movable controlling means therefor, of power means for operating said controlling means and means for automatically energizing said power means under different operating conditions of said machine for driving said controlling means at different speeds.

17. The combination with a dynamo-electric machine and a rotatable controller therefor, of means responsive to different operating conditions of said machine for varying the speed of said controller.

18. The combination with a dynamo-electric machine and a rotatable controller therefor, of electro-responsive means for automatically operating said controller at a lower speed during machine operation than during inoperative periods of said machine.

19. The combination with a dynamo-electric machine and movable controlling means therefor, of power means for operating said controlling means, and means responsive to the position of said controlling means for signalling the period of operation of said power means.

20. The combination with a dynamo-electric machine and a rotatable controller therefor, of means for driving said controller, manually operable means for initially energizing said machine, and means for signalling when it is permissible to release said manual means.

In testimony whereof, I have hereunto subscribed my name this 21st day of August 1917.

CHARLES H. HODGKINS.